US010334012B2

(12) United States Patent
Jung et al.

(10) Patent No.: US 10,334,012 B2
(45) Date of Patent: Jun. 25, 2019

(54) DISPLAY MODE OF ELECTRONIC DEVICE

(71) Applicant: Samsung Electronics Co., Ltd., Gyeonggi-do (KR)

(72) Inventors: Euichang Jung, Seoul (KR); Saemee Yim, Gyeonggi-do (KR); Doosuk Kang, Gyeonggi-do (KR); Bokun Choi, Seoul (KR); Minkyung Hwang, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 130 days.

(21) Appl. No.: 14/314,781

(22) Filed: Jun. 25, 2014

(65) Prior Publication Data
US 2015/0007044 A1  Jan. 1, 2015

(30) Foreign Application Priority Data

Jun. 27, 2013 (KR) .................... 10-2013-0074721

(51) Int. Cl.
| G06F 3/14 | (2006.01) |
| H04L 29/08 | (2006.01) |
| G06F 3/0488 | (2013.01) |
| G06F 17/22 | (2006.01) |
| G06F 17/21 | (2006.01) |
| G06F 9/451 | (2018.01) |
| G06F 16/955 | (2019.01) |
| G06F 16/957 | (2019.01) |

(52) U.S. Cl.
CPC ............ *H04L 67/02* (2013.01); *G06F 3/0488* (2013.01); *G06F 9/451* (2018.02); *G06F 16/9562* (2019.01); *G06F 16/9577* (2019.01); *G06F 17/211* (2013.01); *G06F 17/2247* (2013.01); *H04L 67/2823* (2013.01)

(58) Field of Classification Search
CPC ..................................... G06F 3/14; G06F 3/17
USPC ............... 715/234, 236, 243, 246, 745, 769; 705/14.1; 345/619
See application file for complete search history.

(56) References Cited

U.S. PATENT DOCUMENTS

| 2004/0167933 A1 | 8/2004 | Lomelin-Stoupignan et al. |
| 2005/0193053 A1 | 9/2005 | Kendall et al. |
| 2006/0262136 A1* | 11/2006 | Vaisanen ............... G06F 3/0485 345/619 |
| 2009/0282344 A1 | 11/2009 | Kim |
| 2009/0313567 A1* | 12/2009 | Kwon .................. G06F 3/0482 715/769 |

(Continued)

OTHER PUBLICATIONS

How to enable Reader Mode in Firefox for Android—CNET; 8 pages; www.cnet.com/techculture; Oct. 2012.*
European Search Report dated Aug. 24, 2017.

*Primary Examiner* — Ruay Ho
(74) *Attorney, Agent, or Firm* — Cha & Reiter, LLC.

(57) ABSTRACT

Method and apparatus for managing an application display mode of an electronic device are disclosed. In one embodiment of the system for managing an application display mode of an electronic device, the system first detects user input of a display mode that designates a layout of a page. The system then transmits a request for the page and the display mode to the server. Upon receiving the page from the server, the system displays the page received from the server such that the page is displayed in accordance with the layout designated in the display mode.

12 Claims, 12 Drawing Sheets

(56) References Cited

U.S. PATENT DOCUMENTS

| | | | |
|---|---|---|---|
| 2011/0078582 A1 | 3/2011 | Christianson et al. | |
| 2012/0096344 A1 | 4/2012 | Ho et al. | |
| 2012/0136698 A1* | 5/2012 | Kent | G06Q 20/3276 |
| | | | 705/14.1 |
| 2013/0097488 A1* | 4/2013 | Coman | H04L 41/0246 |
| | | | 715/243 |
| 2013/0117657 A1* | 5/2013 | Verlaan | G06F 17/212 |
| | | | 715/234 |
| 2013/0305145 A1* | 11/2013 | Jackson | G06F 17/211 |
| | | | 715/246 |
| 2013/0326337 A1* | 12/2013 | Lehmann | G06F 17/30905 |
| | | | 715/236 |

\* cited by examiner

DISPLAY MODE OF ELECTRONIC DEVICE

CROSS-REFERENCE TO RELATED APPLICATION

This application claims the benefit of priority under 35 U.S.C. § 119(a) from Korean Patent Application No. 10-2013-0074721, filed on Jun. 27, 2013, which is hereby incorporated by reference for all purposes as if fully set forth herein.

BACKGROUND

1. Field

The present disclosure relates to a method and apparatus for controlling an electronic device, and more particularly, to a method and an apparatus for managing a display mode in an electronic device 2. Description of Related Art Due to assortment of devices in the market today, web pages or applications displayed in a device may be adjusted in accordance with the size of the display. In particular, when an electronic device is small, such as less than or equal to four to five inches, a page suitable for the smaller screen may be rendered. The size of the screen may be smaller than the page, but simpler contents may be used to make it easier to view in the smaller screen.

An electronic device, such as a tablet, may have a screen that is greater than or equal to seven inches. In this case, the page may be further adjusted to fit in accordance with the size of the tablet. This may be achieved by considering the size of the display and the capacity of the device during development of the application or web page. Browsers today also store records, such as bookmarks, favorite pages, visited page history, and the like.

SUMMARY

Small electronic devices, tablets, and larger electronic devices may support a predetermined mobile page or a predetermined desktop page. For small displays, when the URL is input into an address window of a web browser, the electronic device may not display the page or it may redirected the user to a page customized for smaller devices. In the case of small electronic devices, the desktop version of the page may be rendered until a mode conversion service is used. The mode conversion service is an optional function of the web page that may be inconvenient and cumbersome for the user to employ.

When a mobile page is rendered in a mid-size electronic device, such as a tablet, the user may be required to input a special URL that is custom made for the tablet screen size or may execute the mobile mode conversion service. However, inputting a special URL may be difficult since most users may not be aware of the URL or of the custom made page.

Also, executing the mode conversion process may be cumbersome, since it may need to be executed each time a page is visited. Recording the mobile site in, for example, a bookmark, favorites, history, and the like, may not make the conversion more efficient. For example, a mobile page URL stored in a bookmark, may still render the desktop page first, requiring the user to go through the burdensome conversion procedure repeatedly.

The present disclosure aims to solve the aforementioned problems. An object of the present disclosure is to provide a method and an apparatus that may collectively manage addresses for displaying pages and manage display modes displayed in accordance with the user's preference.

Also, another object of the present disclosure is to provide a method and an apparatus for adjusting a display mode on the display without a separate selection menu on the page display screen.

In accordance with aspects of the present disclosure, there is provided a method of managing an application display mode of an electronic device. The method may include: detecting input of a display mode that designates a layout of a page; transmitting a request for the page to a server; transmitting the display mode to the server; and displaying the page received from the server such that the page is displayed in accordance with the layout designated in the display mode.

In accordance with another aspect of the present disclosure, there is provided a method of managing an application display mode of an electronic device. The method may include: displaying a page list containing information associated with at least one page; detecting a display mode change for a specific page in the page list; and displaying the specific page in accordance with the display mode change.

In accordance with another aspect of the present disclosure, there is provided an electronic device for displaying a page. The electronic device may include: a display unit; an input unit; a control unit to: detect a display mode entered via the input unit, the display mode designating a layout of a page; transmit a request for the page to a server; transmit the display mode to the server; and display, using the display unit, the page received from the server such that the page is displayed in accordance with the layout designated in the display mode.

In accordance with yet another aspect of the present disclosure, there is provided an electronic device for displaying a page. The electronic device may include: a display unit; an input unit; a control unit to: display a page list on the display unit containing information associated with at least one page; detect, on the input unit, a display mode change entered for a specific page in the page list; and display, on the display unit, the specific page in accordance with the display mode change.

Thus, the techniques disclosed herein allow a user to change the display mode of a page conveniently. Operation and availability of web pages may be improved by enabling the user to select the display mode suited for the electronic device without having to select a separate option when the electronic device displays a page. Also, availability can be further improved by displaying a page in accordance with the configured display mode, when the user visits an identical or similar page in the future. Moreover, operation of the electronic device can be improved by providing a method in which it is possible to collectively change a display mode.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION

Figure 1:
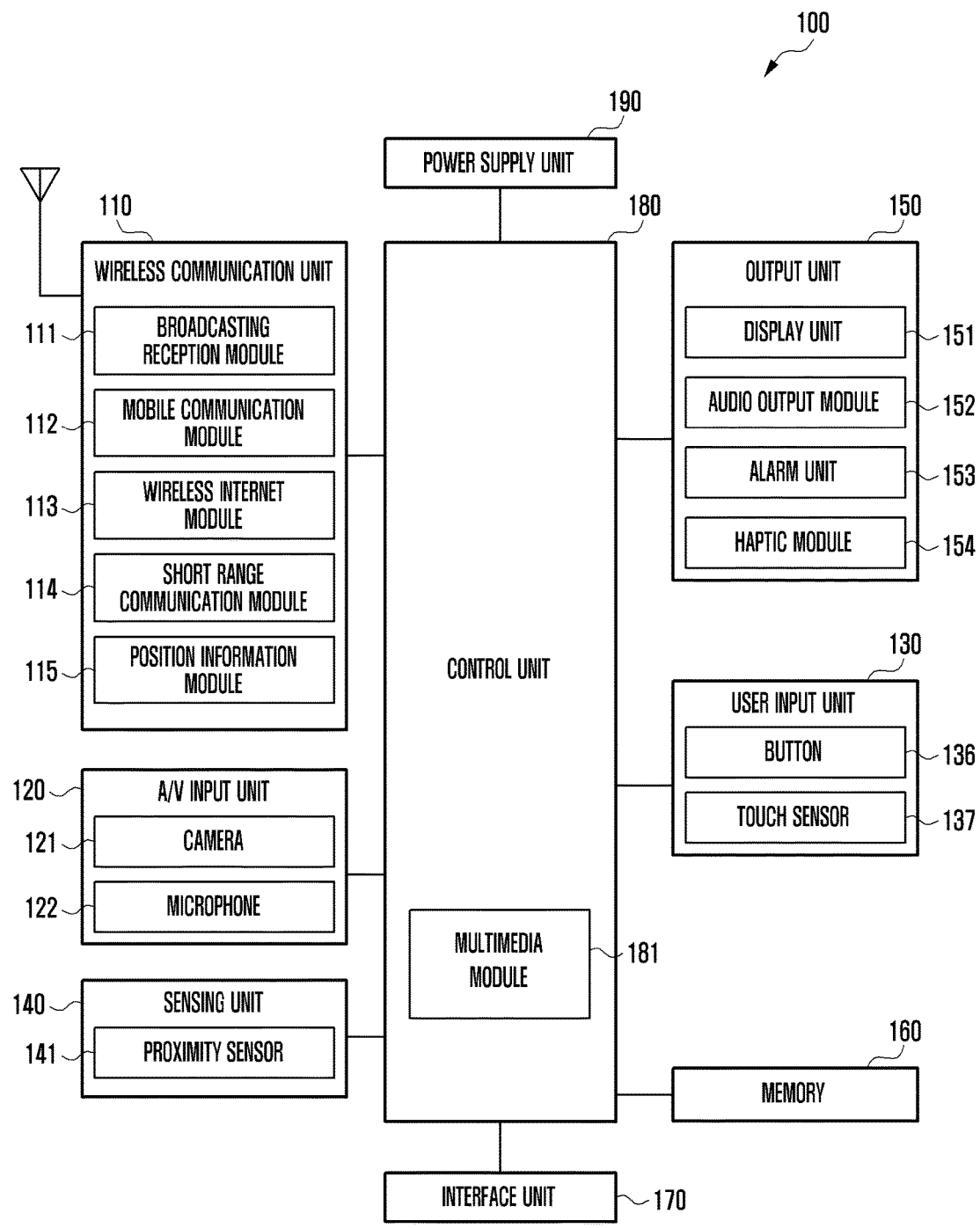
FIG. 1 is a block diagram illustrating an example electronic device in accordance with aspects of the present disclosure.

Hereinafter, examples of the present disclosure will be described in detail with reference to the accompanying drawings.

In describing the examples herein, description of technical content understood by one of ordinary skill that are not directly associated with the present disclosure will be omitted. Such an omission is intended to prevent obscuring the present disclosure.

Some elements are exaggerated, omitted, or schematically drawn in the attached drawings. Further, the size of each element does not entirely reflect the actual size. In the drawings, identical or corresponding elements are provided with identical reference numerals.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine. These computer program instructions may also be stored in a non-transitory computer-readable medium that may cause a computer or other programmable data processing apparatus to function in a particular manner. The instructions stored in the non-transitory computer-readable medium produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" or "module" refers to a software element or a hardware element, such as a Field Programmable Gate Array (FPGA) or an Application Specific Integrated Circuit (ASIC), which performs a predetermined function. However, the "unit" or "module" does not always have a meaning limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" may be either combined into a smaller number of elements, "unit", or "module" or divided into a larger number of elements, "unit", or "module". Moreover, the elements and "units" or "modules" may be implemented to reproduce one or more CPUs within a device or a security multimedia card.

An electronic device may include more than one of a portable phone, a smart phone, a laptop computer, an electronic device for digital broadcasting, a personal digital assistant (PDA), a portable multimedia player (PMP), a navigation device, and the like. However, it should be easily known to those skilled in the art the construction used in the examples of the present disclosure may be applied to a fixed type electronic device such as a digital television (TV), a desktop computer, and the like, except for such a case as applied only to the electronic device.

FIG. 1 is a block diagram illustrating an example electronic device in accordance with aspects of the present disclosure. Referring to FIG. 1, the electronic device 100 may include a wireless communication unit 110, an audio/video (A/V) input unit 120, a user input unit 130, a sensing unit 140, an output unit 150, a memory 160, an interface unit 170, a control unit 180, a power supply unit 190, and the like. Some component elements illustrated in FIG. 1 may not be essential and an electronic device may have more or less of the component elements shown in FIG. 1.

Hereinafter, the component elements of the example electronic device shown in FIG. 1 will be described, sequentially.

The wireless communication unit 110 may include one or more modules which can perform wireless communication between the electronic device 100 and a wireless communication system, or between the electronic device 100 and a network provided with the electronic device 100. For instance, the wireless communication unit 110 may include a broadcasting reception module 111, a mobile communication module 112, a wireless internet module 113, a short range communication module 114, and a position information module 115, and the like.

The broadcasting reception module 111 may receive a broadcasting signal and/or broadcasting related information from an external broadcasting management server through a broadcasting channel. The broadcasting channel may include a satellite channel, and a terrestrial channel. To perform simultaneous broadcasting reception or broadcasting channel switching with respect to at least two broadcasting channels, two or more broadcasting reception modules may be provided to the electronic device 100.

The broadcasting managing server may refer to a server that generates and transmits a broadcasting signal and/or broadcasting related information, or a server that is provided with a generated broadcasting signal and/or broadcasting related information, and transmits the same to a terminal. The broadcasting signal may include a TV broadcasting signal, a radio broadcasting signal, a data broadcasting signal, and may also include a broadcasting signal in a form of combination of a TV broadcasting signal or a radio broadcasting signal and a data broadcasting signal.

The broadcasting related information refers to information associated with a broadcasting channel, a broadcasting program, or a broadcasting service provider. The broadcasting related information may be provided over a mobile communication network. In this case, the information may be received by the mobile communication module 112.

The broadcasting related information may exist in various forms. For instance, it can be provided in such a form as an electronic program guide (EPG) of digital multimedia broadcasting (DMB) or an electronic service guide (ESG) of digital video broadcast-handheld (DVB-H), and the like.

The broadcasting reception module 111 can receive, for instance, digital broadcasting signals by using a digital broadcasting system such as a DMB-T (Digital Multimedia Broadcast-Terrestrial), a DMB-S (Digital Multimedia Broadcasting-Satellite), a MediaFLO (Media Forward Link Only), a DVB-H (Digital Video Broadcast-Handheld), a DVB-CBMS (Convergence of Broadcasting and Mobile Service), an OMA-BCAST (Open Mobile Alliance-Broadcast), a CMMB (China Multimedia Mobile Broadcasting), a MBBMS (Mobile Broadcasting Business Management System), an ISDB-T (Integrated Services Digital Broadcast-Terrestrial), and the like. The broadcasting reception module 111 may be configured to be appropriate for another broadcasting system, in addition to the described digital broadcasting system.

The broadcasting signal and/or the broadcasting related information received through the broadcasting reception module 111 may be stored in the memory 160.

The mobile communication module 112 may transmit and receive a wireless signal to/from at least one of a base station, an external terminal, and a server over a mobile communication network, such as Gobal System for Mobile communications (GSM), Code Division Multiple Access (CDMA), and Wideband CDMA (WCDMA) (not limited thereto). The wireless signal may include data provided in various forms as a voice call signal, a video call signal, or a text/multimedia message is transmitted and received.

The wireless Internet module 113 may refer to a module for wireless Internet connection, and may be contained inside or outside the electronic device 100. Wireless LAN (WLAN)(Wi-Fi), Wireless broadband (Wibro), World Interoperability for Microwave Access (Wimax), High Speed Downlink Packet Access (HSDPA), GSM, CDMA, WCDMA, Long Term Evolution (LTE) (not limited thereto), and the like can be utilized as a wireless internet technology.

The wireless internet module 113 can be interpreted as a type of the mobile communication module 112, from the point of view that wireless internet connection by way of Wibro, HSDPA, GSM, CDMA, WCDMA, LTE, and the like is performed through a mobile communication network.

The short range communication module 114 refers to a module for short range communication. Bluetooth, Radio Frequency Identification (RFID), IrDA (infrared Data Association) communication, Ultra Wideband (UWB), ZigBee, and the like can be utilized as a short range communication technology.

The position information module 115 refers to a module for obtaining a location of an electronic device, and a representative example includes a Global Position System (GPS) module.

In accordance with recent development of technology, the position information module 115 can acquire three-dimensional position information based on latitude, longitude, and altitude by applying trigonometry to the required information, after producing accurate time information and distance information spaced apart from three or more satellites. Currently, a method of calculating location and time information using three satellites, and correcting an error of the calculated location and time information using another satellite, has been widely used. Also, the position information module 115 continuously calculates a current location in real time and thus, may calculate speed information.

Referring to FIG. 1, the audio/video (A/V) input unit 120 is to input an audio signal or a video signal, and may include a camera 121, a microphone 122, and the like. The camera 121 processes an image frame such as a still image, a video, or the like obtained by an image sensor in a video call mode or a photographing mode. The processed image frame may be displayed on the display unit 151.

The image frame processed in the camera 121 may be stored in the memory 160 or be transmitted outside through the wireless communication unit 110. Two or more cameras 121 may be included based on a service environment.

The microphone 122 may receive an input of an external sound signal through a microphone and processes the signal into electrical voice data, in a call mode, a recording mode, a voice recognition mode, and the like. In the case of the call mode, the processed voice data may be converted into a form that may be transferable to a mobile communication base station through the mobile communication module 112, and may be output. In the microphone 122, various noise removal algorithms may be embodied for removing noise generated during a process of receiving an external sound signal.

The user input unit 130 generates input data for controlling an operation of the electronic device by the user. The user input unit 130 may be configured to include buttons 136 disposed on the front, back, or lateral sides of the electronic device 100, and a touch sensor (resistive/capacitive) 137, and, although not illustrated, may be configured to further include a keypad, a dome switch, a jog wheel, a jog switch, and the like.

The sensing unit 140 generates sensing signals for controlling operations of the electronic device 100 by sensing a present state of the electronic device 100 such as an open or closed state of the electronic device 100, a position of the electronic device 100, the presence of user contact, an orientation of the electronic device, an acceleration/reduction of electronic device, and the like. For instance, when the electronic device 100 is a slide phone type, it is possible to sense whether the slide phone is opened and closed. Also, whether the power supplier 190 supplies power, whether the interface unit 170 is coupled with an external device, or the like may be sensed. Meanwhile, the sensing unit 140 may include a proximity sensor 141. (The proximity sensor will be described below.)

The output unit 150 is to generate an output associated with visual sensation, auditory sense, tactile sense, or the like, and may include a display unit 151, a sound output unit 152, an alarm unit 153, a haptic module 154, and the like.

The display unit 151 displays (outputs) information processed in the electronic device 100. For example, when the electronic device is in a call mode, the display unit 151 may display a User Interface (UI) or a Graphic User Interface (GUI) associated with a call. When the electronic device 100 is in the video call mode or the photographing mode, the display unit 151 displays a photographed and/or received image, UI, or GUI.

The display unit 151 may include at least one of a Liquid Crystal Display (LCD), a Thin Film Transistor-Liquid Crystal Display (TFT LCD), an Organic Light-Emitting Diode (OLED), a flexible display, and a 3D display.

A few of the displays may be configured to be a transparent type or a light transmission type so that the outside may be viewed through the displays. This may be referred to as a transparent display, and a representative transparent display includes a Transparent OLED (TOLED) and the like. The structure of the back of the display unit 151 may be configured to be a structure of a light transmission type. With this structure, the user can see objects located in the rear of a body of the electronic device through an area which the display unit 151 of the body of the electronic device occupies.

Two or more display units 151 may exist in accordance with one implementation of the electronic device 100. For example, in the electronic device 100, a plurality of display units may be disposed to be spaced apart from one another side or to be integrated, or may be disposed on different sides.

When the display unit 151 and the touch sensor 137 form a layer structure or are formed to be integrated (hereinafter, referred to as a 'touch screen'), the display unit 151 may be used as an input device, in addition to an output device. The touch sensor is in a form of, for example, a touch film, a touch sheet, a touch pad, and the like, the touch sensor may be formed in a layer structure by being layered on the display unit 151, and may be included in the configuration of the display unit 151 and may be integrated.

The touch sensor may be configured to convert, into an electrical input signal, a pressure provided on a predetermined portion of the display unit 151 or a change in a capacitance and the like generated in a predetermined portion of the display unit 151. The touch sensor may be configured to detect a pressure of a touch, in addition to a location and an area of the touch, when the touch is provided.

When a touch input for the touch sensor exists, a signal(s) corresponding to the touch input is transferred to a touch controller (not illustrated). The touch controller processes the signal(s) and then transmits corresponding data to the control unit 180. Therefore, the control unit 180 may be aware of an area of the display unit 151 that is touched and the like.

The proximity sensor 141 may be disposed in an internal area of the electronic device 100 which is enclosed by the touch screen or may be disposed near the touch screen. The proximity sensor refers to a sensor that detects whether an object that approaches a predetermined side for detection or an object adjacent to the side exists, using an electromagnetic field force or infrared light, without a mechanical contact. The proximity sensor has a longer lifecycle and higher utilization than a contact type sensor.

Examples of the proximity sensor are a transmitting photoelectric sensor, a direct reflective photoelectric sensor, a mirror reflective photoelectric sensor, a high frequency oscillation proximity sensor, an electrostatic capacity proximity sensor, a magnetic proximity sensor, an infrared proximity sensor, or the like. When the touch screen is a capacitive type, it may be configured to detect the proximity of a pointer based on a change in a magnetic field which occurs as the pointer approaches. In this case, the touch screen (touch sensor) may be classified as a proximity sensor.

Hereinafter, for a convenient of the description, an action in which a pointer approaches the touch screen without contacting the touch screen so as to recognize that the pointer is located on the touch screen may be called "a proximity touch" and an action in which a pointer actually touches the touch screen may be called "a contact touch". The location on the touch screen where the proximity touch of the pointer occurs may refer to a location where the pointer is vertical to the touch screen when the pointer is in a proximity touch.

The proximity sensor detects a proximity touch, a proximity touch pattern (e.g., a proximity touch distance, a proximity touch direction, a proximity touch speed, a proximity touching time, a proximity touch position, a proximity touch shift state, etc.) Information corresponding to the detected proximity touch motion and the proximity touch pattern may be output on the touch screen.

The sound output unit 152 may output audio data which is received from the wireless communication unit 110 in a call signal reception mode, a call mode, a recording mode, a voice recognition mode, a broadcast receiving mode and/or the like, or stored in the memory 160. The sound output unit 152 may output a sound signal associated with a function (for example, a call signal reception sound, a message reception sound, and the like) executed in the electronic device 100. The sound output unit 152 may include a receiver, a speaker, a buzzer, and the like.

The alarm unit 153 outputs a signal for announcing an event occurrence of the electronic device 100. Examples of the event occurring in the electronic device include reception of a call signal, a reception of a message, an input of a key signal, an input of a touch, and the like. The alarm unit 153 may output a signal for announcing an event occurrence through a different form excluding a video signal or an audio signal, for example, vibration. The video signal or the audio signal may be output through the display unit 151 or the voice output module 152 and thus, in this example, the display unit 151 and the voice output module 152 may be classified as a type of alarm unit 153.

The haptic module 154 may generate various tactile effects that a user may feel. A representative example of the tactile effect generated by the haptic module 154 includes vibration. The intensity and pattern, and the like of the vibration produced from the haptic module 154 can be controlled. For example, different vibrations may be composed for output, or may be sequentially output.

In addition to the vibration, the haptic module 154 may generate various tactile effects such as an effect by arrangement of pins which are in vertical movement with respect to a contact surface of skin, jet force or suction force of air through an outlet or an inlet, brushing against a surface of the skin, contact of an electrode, stimulus by electrostatic force, and the like, an effect by reproduction of a sense of cold and warmth using heat absorption or heat generation, and the like.

The haptic module 154 may be embodied to transfer a tactile effect through direct contact, and to enable a user to feel a tactile effect through muscle sense of fingers, arms, and the like. Two or more haptic modules 154 may be included based on a configuration pattern of the electronic device 100.

The memory unit 160 may store a program for processing and controlling the control unit 180, and may execute a function of temporarily storing input/output data (for example, a phone book, a message, audio data, a still image, video data, and the like). The memory unit 160 may store a frequency of use for each data (for example, the frequency of use for each phone number, each message, and each multimedia).

Also, the memory unit 160 may store data associated with vibrations and sounds of various patterns output when a touch is input to the touch screen. The memory unit 160 may include at least one type of storage medium of a flash memory type, a hard disk type, a multimedia card micro type, a card type memory (for example, an SD memory, an XD memory or the like), a Random Access Memory (RAM), a Static RAM (SRAM), a Read-Only Memory (ROM), an Electrically Erasable Programmable ROM (EEPROM), a Programmable Read-Only Memory (PROM), a magnetic memory, a magnetic disk, and an optical disk. The electronic device 100 may operate in association with a web storage that executes a storage function of the memory 160 on the Internet.

The interface unit 170 may play a role as a passage to external devices connected to the electronic device 100. The interface unit 170 may receive data from an external device, may be supplied with a power and then the power may be delivered to elements within the electronic device 100, or may enable data to be transferred to an external device from an inside of the electronic device 100. For example, the interface unit 170 may include a wire/wireless headset port, an external charger port, a wire/wireless data port, a memory card port, a port for coupling to a device having an identity module, an audio input/output (I/O) port, a video input/output (I/O) port, an earphone port and/or the like.

The identification module is a chip that stores various configurations of information for authenticating authority for use of the electronic device 100, and may include a User Identify Module (UIM), a Subscriber Identity Module (SIM), a Universal Subscriber Identity Module (USIM), and the like. The device equipped with the identification module (hereinafter, 'identification device') may be manufactured in a form of a smart card. Therefore, the identification device may be connected to the electronic device 100 through the port.

When a cradle is connected to the electronic device 100, the interface unit 170 may play a role as a passage for supplying a power to the electronic device 100 from the cradle or may play a role as a passage for delivering various command signals, which are inputted from the cradle by a user, to the electronic device 100. The various command signals or power input from the cradle may operate as signals used for recognizing that the electronic device is accurately installed in the cradle.

The control unit 180 generally controls an overall operation of the electronic device. For example, for a voice call, data communication, a video call, and the like, related controlling and processing may be executed by the control unit 180. The control unit 180 may include a multimedia module 181 for playing multimedia. The multimedia module 181 may be embodied inside the control unit 180, or may be embodied to be separate from the control unit 180.

The control unit 180 may execute a pattern recognition processing that recognizes a writing input and a drawing input provided on the touch screen as a character and an image, respectively.

The power supplier 190 may supply power required for operations of component elements by receiving power from the outside and inside in accordance with a control of the control unit 180. The power supplier 190 may include, for example, a battery, a connection port, a power supply controller, and a charging monitoring unit.

The battery may be an embedded battery which is rechargeable, or may be coupled with a body of the electronic device to be detachable for charging or the like. The connection port may be configured as an example of the interface 170 to which an external charger that supplies power for charging a battery is electrically connected.

Various examples described herein may be embodied in a non-transitory computer (or a similar device)-readable recording medium using, for example, software, hardware, or a combination thereof.

In a manner of hardware, the examples described herein may be embodied using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for executing other functions. In some cases, the examples described in the present specification may be implemented by the control unit 180 in itself.

In a manner of software, examples described in the present specification, such as a procedure and a function may be implemented through separated software modules. Each of the software modules may implement one or more functions and operations described in the present specification. A software code may be embodied through a software application written in an appropriate program language. The software code may be stored in the memory 160, and may be implemented by the control unit 180.

Figure 2:
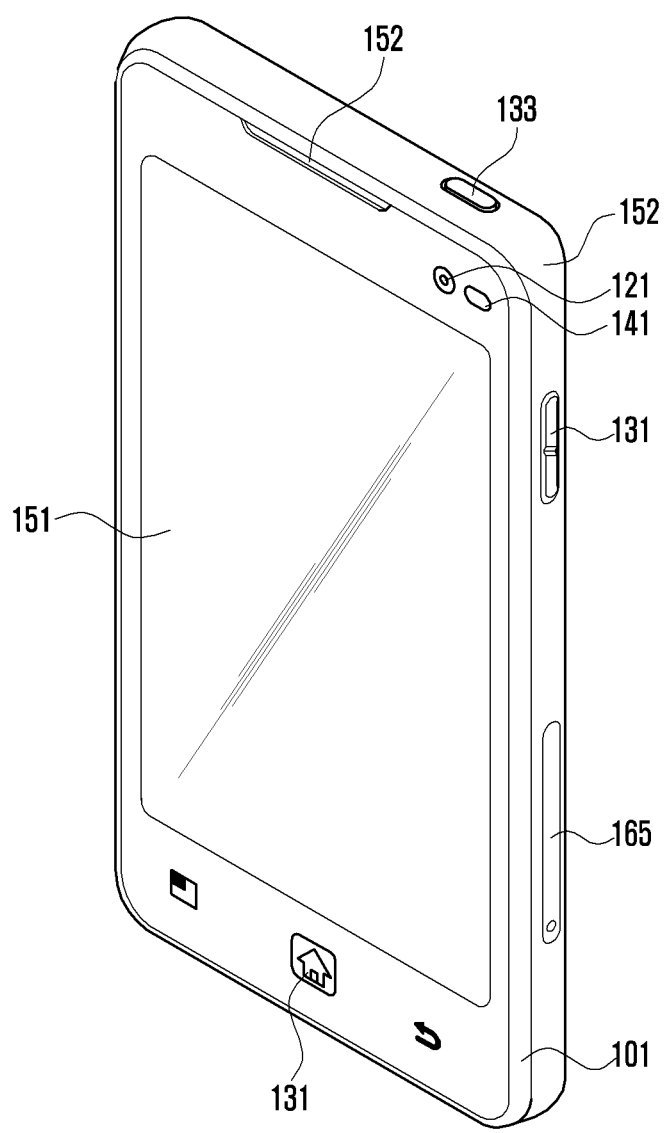
FIG. 2 is an example front perspective view illustrating an example electronic device in accordance with aspects of the present disclosure.

FIG. 2 is a front perspective view illustrating an example electronic device in accordance with aspects of the present disclosure. The electronic device 100 may include a bar type body of the electronic device. However, it is understood that the present disclosure may not be limited to the type of body illustrated herein and that various structures may be employed, such as a slide type, a folder type, a swing type, a swivel type, and the like that includes two or more bodies coupled to move in a relative manner.

The example body of the electronic device 100 includes cases 101, 102, and 103 that form an exterior. In the present example, the case may be formed of various sections, such as front case 101 and rear case 102. Various electronic components are included in a space formed between the front case 101 and the rear case 102.

In the front case 101 and the rear case 102, for a component that may be detachable like a sub-storage medium 165 such as a USIM card, a memory card, and the like, the case may include an opening part through which the component is inserted into the inside of the case from an external side. A slot may be formed on a lateral side of the case so that the sub-storage medium 165 is inserted from the lateral side of the electronic device.

The cases 101, 102, and 103 may be formed by catapulting synthetic resins, or may be formed of metal such as stainless steel (STS), titanium (Ti), or the like.

On the case 101 and 102 of the electronic device, the display unit 151, the sound output unit 152, the camera 121, the user input units 130, 131, and 132, the microphone 122, the interface 170, and the like may be disposed.

In one example, the display unit 151 occupies most of a principal plan of the front case 101. The sound output unit 152 and the camera 121 may be disposed on an area adjacent to one of the two ends of the display unit 151, and the user input unit 131 and the microphone 122 may be disposed on an area adjacent to the other end. The user input unit 132, the interface 170, and the like may be disposed on lateral sides of the front case 101 and the rear case 102.

The user input unit 130 is manipulated to receive a command for controlling operations of the electronic device 100, and may include a plurality of manipulation units 131, 132, and 133. The manipulation units 131, 132, and 133 may be commonly called manipulating portions.

The content input by a first manipulation unit 131 or a second manipulation unit 132 may be variously configured. For example, the first manipulation unit 131 may receive a command such as starting, ending, scrolling, and the like, the second manipulation unit 132 may receive a command such as controlling a volume of a sound output from the sound output unit 152, and the third manipulation unit 133 may receive an input of a command such as a touch recognition mode activation/deactivation of the display unit 151 and the like.

The manipulation units 131, 132, and 133 may be based on a button scheme that recognizes a command when a user applies a pressure, or may include a touch sensor in manipulation units 131, 132, and 133, in addition to in the display unit 151, so as to receive an input of a command with only a touch of a user.

Figure 3:
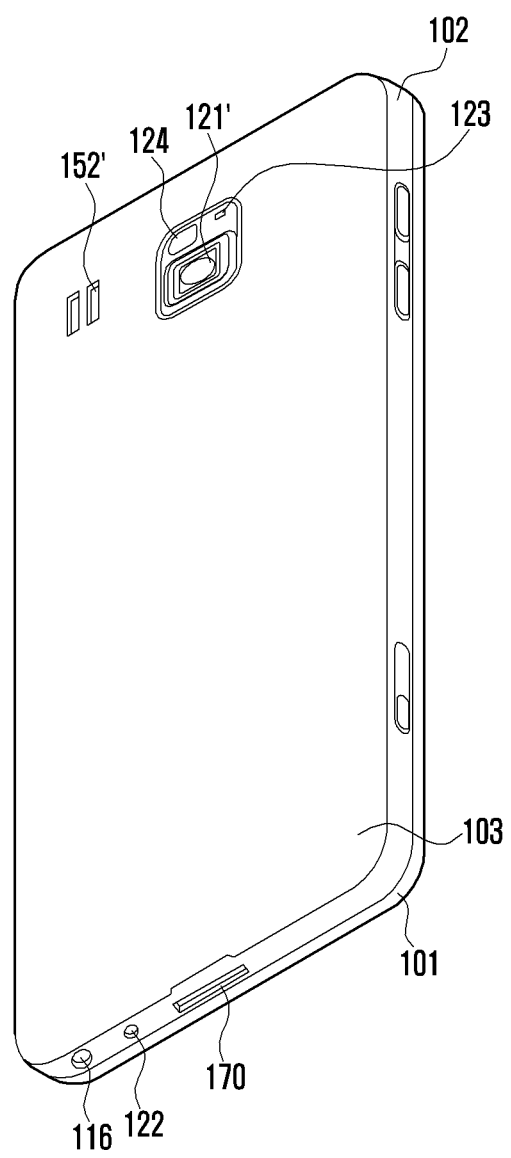
FIG. 3 is an example rear perspective view illustrating an electronic device in accordance with aspects of the present disclosure.

FIG. 3 is a rear perspective view of an electronic device in accordance with aspects of the present disclosure. Referring to FIG. 3, a camera 121' may be additionally installed on the back side of the body of the electronic device, that is, the rear case 102. The camera 121' may be a camera that has a substantially reverse photographing direction of the camera 121 (referring to FIG. 2), and has identical or different number of pixels to/from the camera 121.

For example, it is preferable that the camera 121 has a low number of pixels so as to photograph a face of a user and to readily transmit the photographed image to a partner when a video call and the like is performed, and the camera 121' has a high number of pixels since the camera 121' usually does not immediately transmit a photographed image after photographing a general subject. The cameras 121 and 121' may be installed in the terminal body to be rotated or popped-up.

A flash 123 and a mirror 124 may be additionally disposed near the camera 121'. The flash 123 flashes light toward a subject when the subject is photographed by the camera 121'. When a user desires to photograph (self-photographing) himself/herself using the camera 121', the user may view a face of the user or the like reflected by the mirror 124.

The sound output unit 152' may be additionally disposed on the rear of the body of the electronic device. The rear of the body of the sound output unit 152' may implement a stereo function together with the sound output unit 152 (refer to FIG. 2), and be used for implementing a speaker phone mode during a call.

On a lateral side of the body of the electronic device, a broadcasting signal reception antenna 116 may be additionally disposed other than an antenna for calling. The antenna 116 that forms a portion of the broadcasting reception module 111 (referring to, FIG. 1) may be installed to be withdrawn from the body of the electronic device.

For the convenient of the description, it is assumed that the electronic device 100 mentioned below may include at least one of the constitutional elements shown in FIG. 1.

Figure 4A:
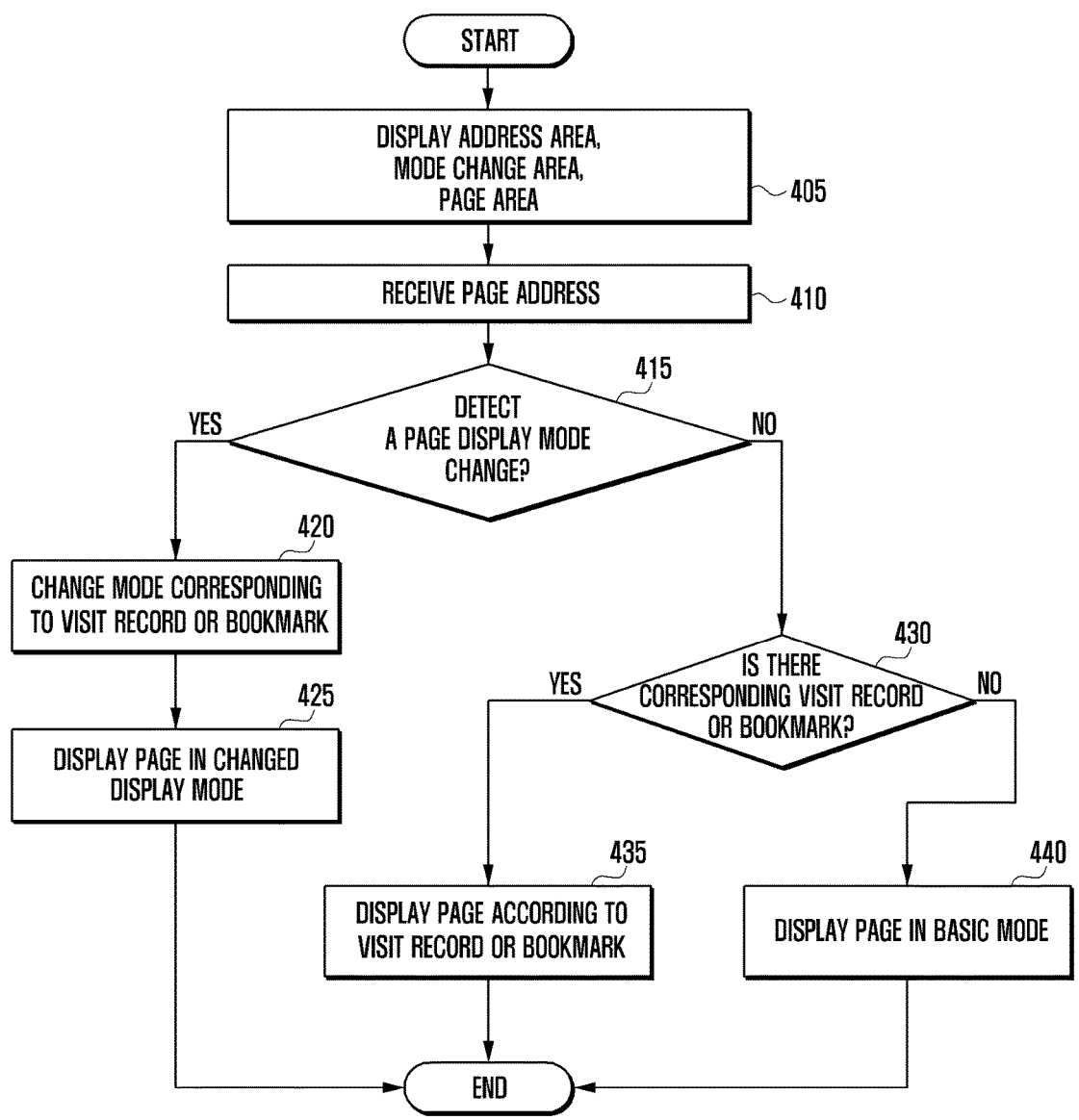
FIG. 4A and FIG. 4B are flow charts illustrating example operations of an electronic device in accordance with aspects of the present disclosure.
Figure 4B:
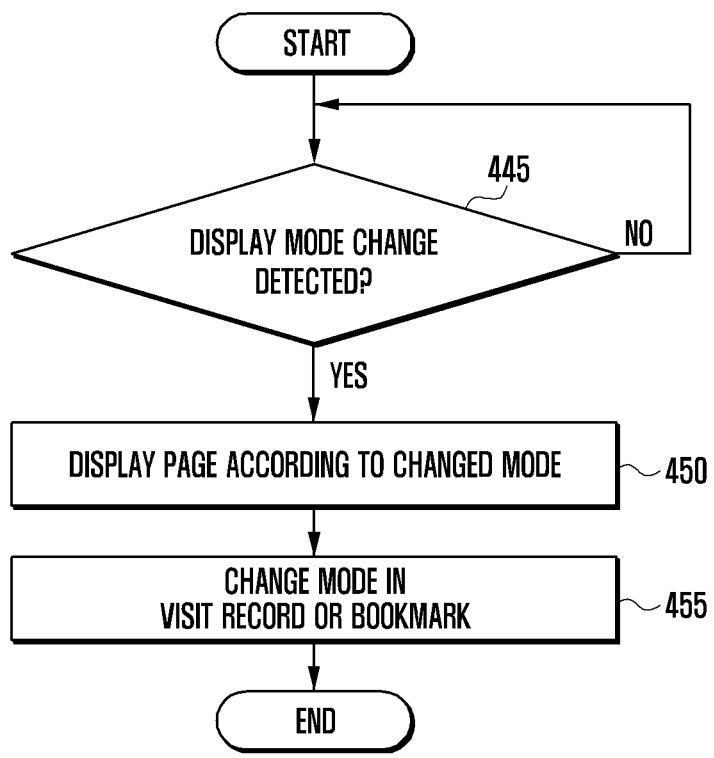

FIGS. 4A and 4B are flow charts illustrating an example method of the electronic device in accordance with aspects of the present disclosure. Referring to FIG. 4A, at block 405, the electronic device may display an address area, a display mode change area, and a page area. In one example, each area may be displayed on a particular section of the display unit. In another example, some of the areas may overlap. The address area may display an address of a page desired by a user.

The display mode change area may be used to change a display mode. The display mode change area may comprise a virtual hold button, a virtual switch button, or a virtual slide button. In another example, the button may overlap the address area.

The page area may display a page corresponding to the address in the address area. The page may be displayed in a first mode in accordance with a display size bigger than a predetermined size and may be displayed in a second mode in accordance with a display size smaller than the predetermined size. The pages of the first mode and the second mode may be provided to the electronic device by a page source server or by the control unit of the electronic device. Also, in a further example, when the displayed page is a web page, the first mode may be a page display size suitable for a desktop and the second mode may include a page display size suitable for a mobile device. Further, in another example, the page for the desktop and the page for the mobile device may be determined based on a request from the electronic device to a server transmitting the web page. The server may transfer the page for the mobile device or the page for the desktop with information included in a header of the request. The page for the mobile device and the page for the desktop may be a page with different page layouts. Also, in a further example, the page for the desktop may have a display size suitable for relatively large screens. In addition, the page for the mobile device may have a display size suitable for relatively small screens. The page for the desktop and the page for the mobile device may include the same content but with different layouts. The display mode information for designating a layout in an electronic device may be determined in accordance with a user input or with a preconfigured value.

At block 410, the electronic device may receive a page address. In a further example, the page address may be determined in accordance with the user input and the user may input the page address by typing the page address or by clicking on a visited page or bookmark record.

At block 415, the electronic device may detect whether a display mode was input. In one example, the page may be displayed in the first mode or the second mode in accordance with the input applied to the display mode change area shown at block 405. In yet a further example, the user may transmit a display mode change signal to the electronic device with a hold button, a switch button, or a slide button. In another aspect, the display mode change may be detected before an address is entered. When a display mode change is detected, the electronic device may identify whether the received page address is stored in a visited page record or in a bookmark and may change the display mode of each record, at block 420. In a further example, when the stored page address is not identical to the received address, but the domain of the stored page matches that of the received address, the electronic device may still change the display mode for the received page. By way of example, if a display mode change for "www.aaa.com" is received and the display mode for "page.aaa.com" is stored in a visited page record or in a bookmark, the electronic device may still change the display mode for "www.aaa.com." In another example, the electronic device may switch the mode configuration of all pages corresponding to "aaa.com" recorded in the bookmark or the visited page record.

At block 425, the electronic device may display the page of the address received at block 410 in the display mode set at block 415. By way of example, a page for the desktop and a page for the mobile device may be provided by the server as "www.aaa.com." However, there may be another version of "www.aaa.com" called "m.abc.com" that is most suitable for display in an electronic device. In this instance, when the user inputs "www.abc.com" at block 410 and the user selects to display the page in a mobile device display mode at block 415, the electronic device may transmit a request to display the page as "m.abc.com" and the server may transmit the page as "m.abc.com." That is, when the user has selected a mobile display mode, the device may transmit a request for the mobile page to the server and the request may include header information associated with the mobile page. Also, in a further example, when an address of the mobile page has been stored in the electronic device, the user may receive the mobile page by requesting the stored address.

In a further example, block 420 and block 425 may be executed simultaneously.

When there is no display mode change detected at block 415, the electronic device may determine whether there is a visited page record or a bookmark corresponding to the received address, at block 430. When there is a visited page record or bookmark, the received page address may be displayed in accordance with a mode indicated in the visited page record or in the bookmark, at block 435. That is, the page may be displayed as it was displayed previously. When there is no visited page record or bookmark, the page may be displayed in a basic mode, at block 440. The basic mode may be a mobile device mode, a desktop mode, or in a mode determined by the server providing the page.

Referring to FIG. 4B, the electronic device 100 may detect a display mode change for a currently displayed page at block 445. As noted above, the display mode change may be input with a hold button, a switch button, or a slide button by the user. When there is no display mode change detected, the electronic device may continuously display the page in the current display mode. When a display mode change is detected, the electronic device may change the display of the currently displayed page in accordance with the changed mode at block 450.

Also, the electronic device may change the visited page record or bookmark associated with the currently displayed page to reflect the new display mode, at block 455. By way of example, when the display mode of "www.abc.com" is changed to a mobile mode, the visited page record or the bookmark associated with "www.abc.com" may be changed in addition to changing the current display of "www.abc.com" on the screen. Thus, the page may be displayed in accordance with the changed configuration when the page address is input by a user in the future. In one example, block 450 and block 455 may be executed simultaneously.

Figure 5:
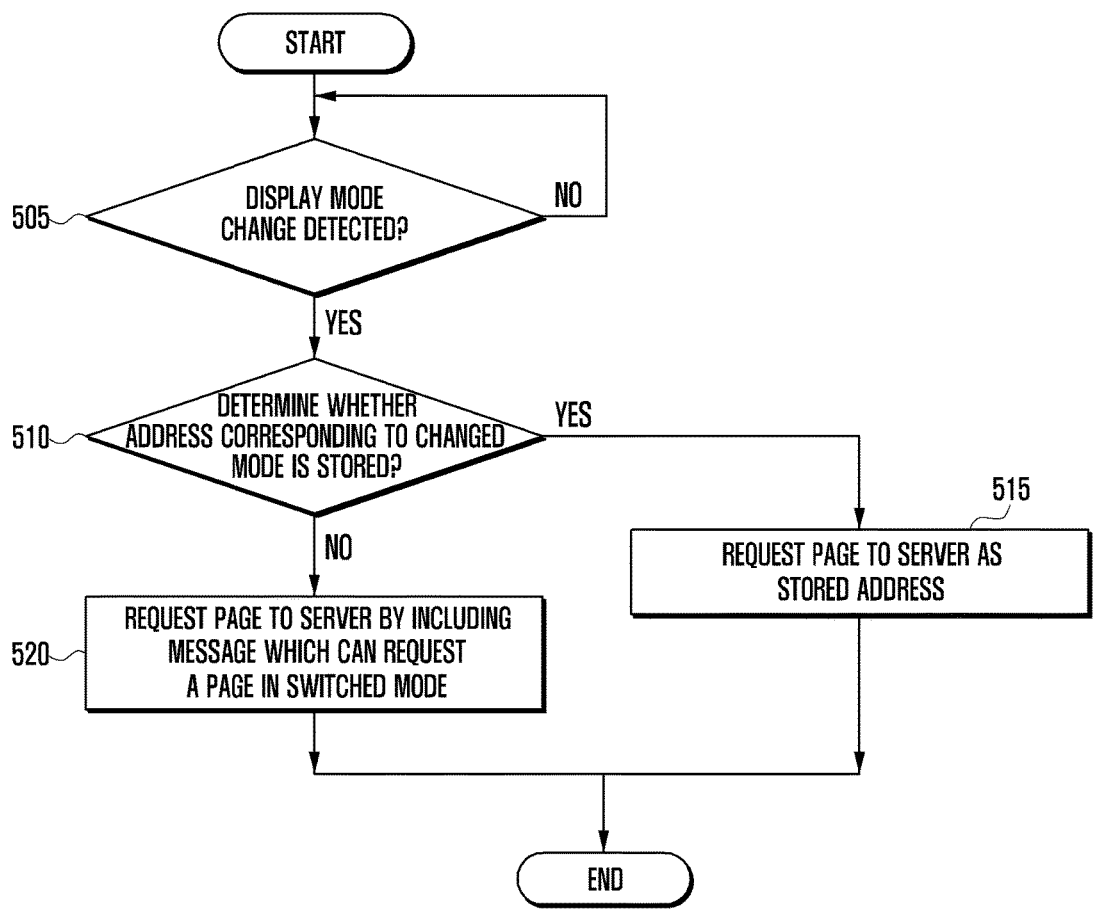
FIG. 5 is a flowchart illustrating example operations of an electronic device in accordance with aspects of the present disclosure.

FIG. 5 is a flowchart illustrating an example method of an electronic device in accordance with aspects of the present disclosure. More specifically, the example in FIG. 5 describes an illustrative method of changing the page display in an electronic device in accordance with a configuration of a user. Referring to FIG. 5, the electronic device 100 may detect whether a display mode change was made at block 505. When the display mode change is not detected, the electronic device may change to a standby state.

At block 510, when the display mode change is detected, the electronic device may determine whether an address configured with the changed mode is stored. For example, when a web page is requested from a server, a particular page may have a unique address for the mobile device and a unique address for the desktop. In this instance, the addresses may be arranged based on a predetermined policy within a domain and the electronic device may store the policy. When visiting the page, an electronic device may store the address redirected by the server based on the policy. Accordingly, the electronic device may store the unique addresses for both the desktop and mobile device display or any other unique address for other displays.

When the address configured with the changed display mode has been stored, the electronic device may transmit a page request message to a server at block 515.

At block 510, when the address configured with the changed mode is not stored, the electronic device may transmit a page request message to a server at block 520. As noted above, the message may include the new display mode in a header of the page request. The server may select and transmit the requested page in response to the message. For example, when the header in the message specifies a mobile or a desktop display mode, the server transmits the page accordingly.

In one example, the header may include user agent (UA) information. In a further example, a UA may be defined as software acting on behalf of a user. For example, in hypertext transfer protocol (HTTP), a client making a request may be identified by the UA provided in the header. The server may determine whether to transmit a page in a mobile display mode or desktop display mode, based on the UA information provided in the header. The UA may vary in accordance with a kind of electronic device, operating system and application. In one example, the electronic device may change and transmit a value of the UA that corresponds with the display mode change. Furthermore, each server may have a different standard. For example, one server may transmit a page for the mobile device and a different server may transmit the page for the desktop in response to the same UA. The electronic device may store the standard of each server and change the value of the UA accordingly.

By way of example, the electronic device may be provided with the following UA:

TABLE 1

Mozilla/5.0 (X11;Linux x86_64) AppleWebKit/534.24(KHTML, like Gecko)
Chrome/11.0.696.34 Safari/534.24

Table 1 illustrates example UAs that may be used to request a desktop display mode. In this example, the electronic device may transmit the page request from the Chrome browser based on X11 or the Mozilla/5.0 browser based on the Linux x86-64 platform, which may also be changed to Safari. The server may transmit the page in a desktop display mode on the basis one of the values shown in Table 1.

TABLE 2

Mozilla/5.0 (Linux; U; Android 4.0.4; en-us;nexus Build/IMM765D) AppleWebKit/534.30
(KHTML, like Gecko) Version/4.0 Mobile Safari/534.30

Table 2 illustrates example UAs that may be used to request a mobile display mode. Here, an en-us nexus electronic device, based on a Linux;u;Android 4.0.4 platform on the basis of the Mozilla/5.0 may be utilized. Furthermore, a KHTML browser layout engine, and a Safari version that is changeable with the Chrome browser version may be utilized.

In one example, the standard of a server may not be based on technical characteristics. However, the page for the desktop and the page for the mobile device may be selected by a user, when the electronic device has already received and stored the standard used by the server. In another example, the electronic device may make the selection deductively. For example, if the server provides pages suitable for desktops and mobile devices, based on a request for a page transmitted from an electronic device, the electronic device may transmit the request for the page with an indicator that indicates a type of a page requested by the user.

Figure 6A:
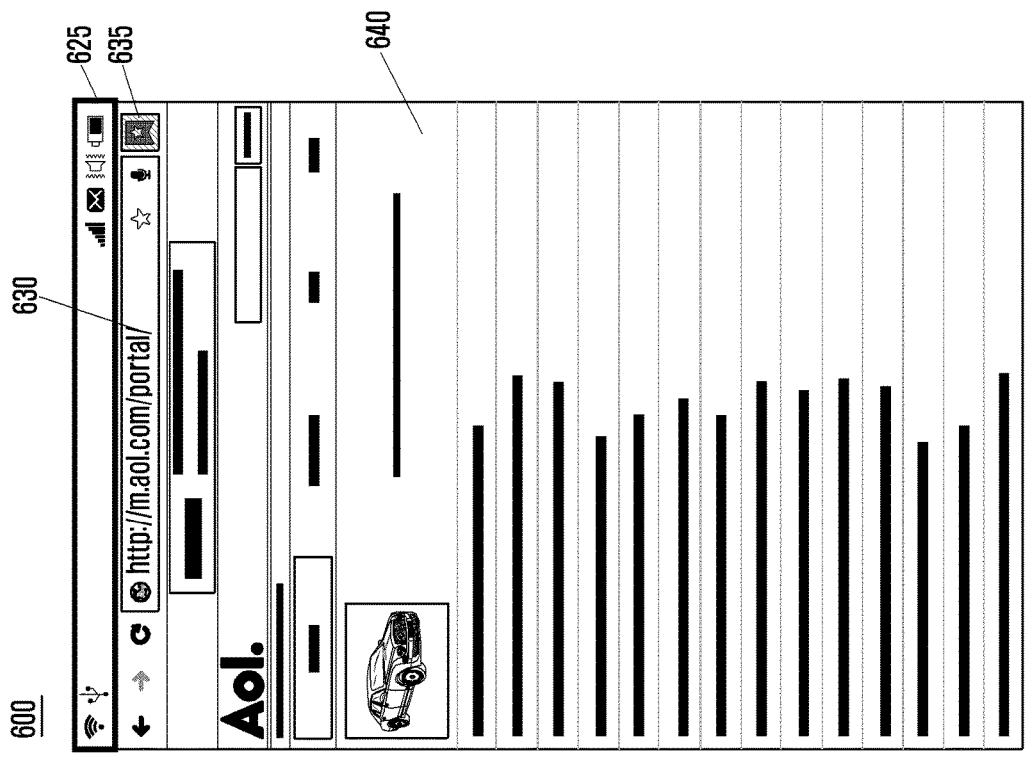
FIG. 6A and FIG. 6B are example views illustrating an example conversion of a display mode in accordance with aspects of the present disclosure.
Figure 6B:
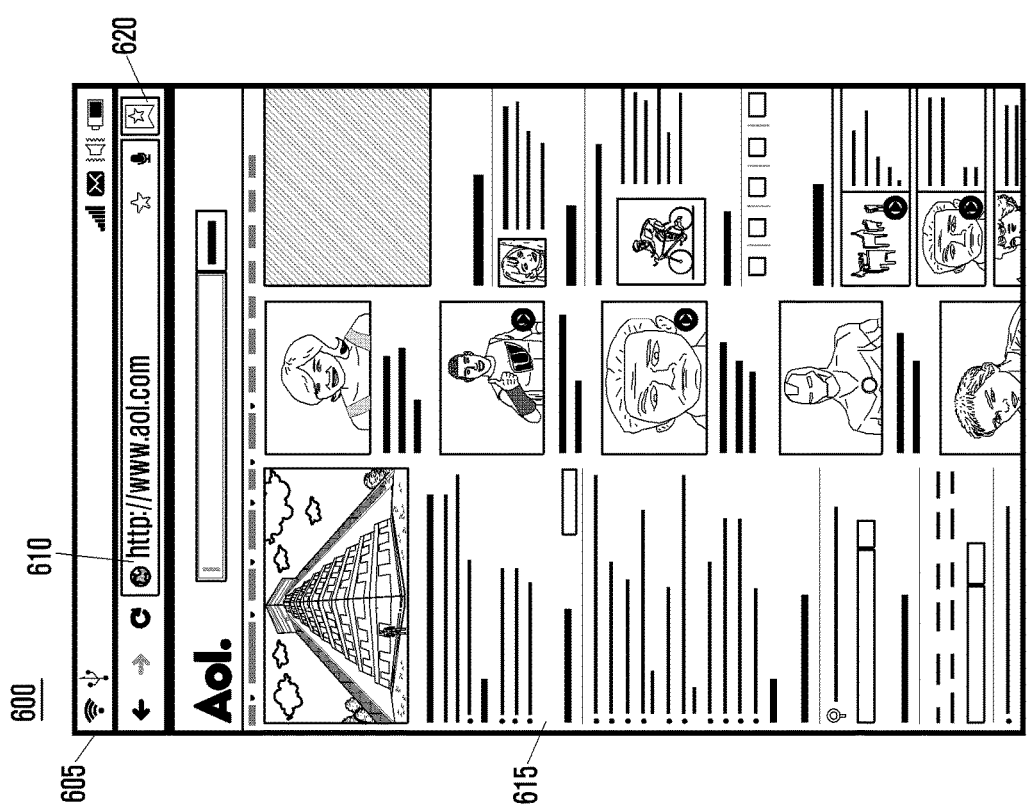

FIGS. 6A and 6B are example views illustrating a conversion of a display mode in accordance with aspects of the present disclosure. More specifically, FIG. 6A is a view illustrating a page for a desktop, and FIG. 6B is a view illustrating a page for a mobile device. Referring to FIG. 6A, a display unit 600 of the electronic device may include a state display area 605, an address area 610, a display mode change area 620 and a page area 615.

The state display area 605 may provide state information of the electronic device and address area 610 may display the address of the page being displayed or to be displayed via display unit 600. The display mode change area 620 may be a UI that allows a user to change a display mode of a page displayed or about to be displayed on display unit 600. The display mode change area 620 may be rendered with a hold button. A button rendered on the display unit may include a virtual button that can be implemented on a touch screen. The page area 615 may display a page corresponding to the address input in address area 610. In another example, the address area 610 may display the page for "aol.com" in a desktop mode.

Referring to FIG. 6B, the display unit 600 of the device may include a state display area 625, an address area 630, a display mode change area 635 and a page area 640.

The state display area 625 may indicate the state of the electronic device and the address area 630 may display the address of the page being displayed or to be displayed via display unit 600. The display mode change area 635 may be a UI that allows a user to change a display mode of a page displayed or about to be displayed on display unit 600 and the display mode change area 635 may be rendered with a hold button. The page area 640 may display a page corresponding to the address input in address area 630. In this example, the address area 610 may display the page for "aol.com" in a mobile mode.

In FIGS. 6A and 6B, the user may switch the mode of a page to be displayed by performing an input on the display mode change areas 620 and 635. In another example, the input may be a touch input or a hold input that maintains the touch input for a predetermined time. A browser may request the page for the mobile device or the page for the desktop in accordance with the input. By way of example, as shown in FIG. 6A, when the hold input is applied on the display mode change area 620, the electronic device may request a server to transmit the page in a mobile display mode so that the page may be displayed as shown in FIG. 6B. With this operation, the electronic device may switch the display mode. In one example, the address sent in the request may be obtained from a visited page record or a bookmark stored in the device. In a further example, the address in the request may be the address input by the user in address area 610 and the request may be transmitted when an input is applied to display mode change area 635.

Figure 7A:
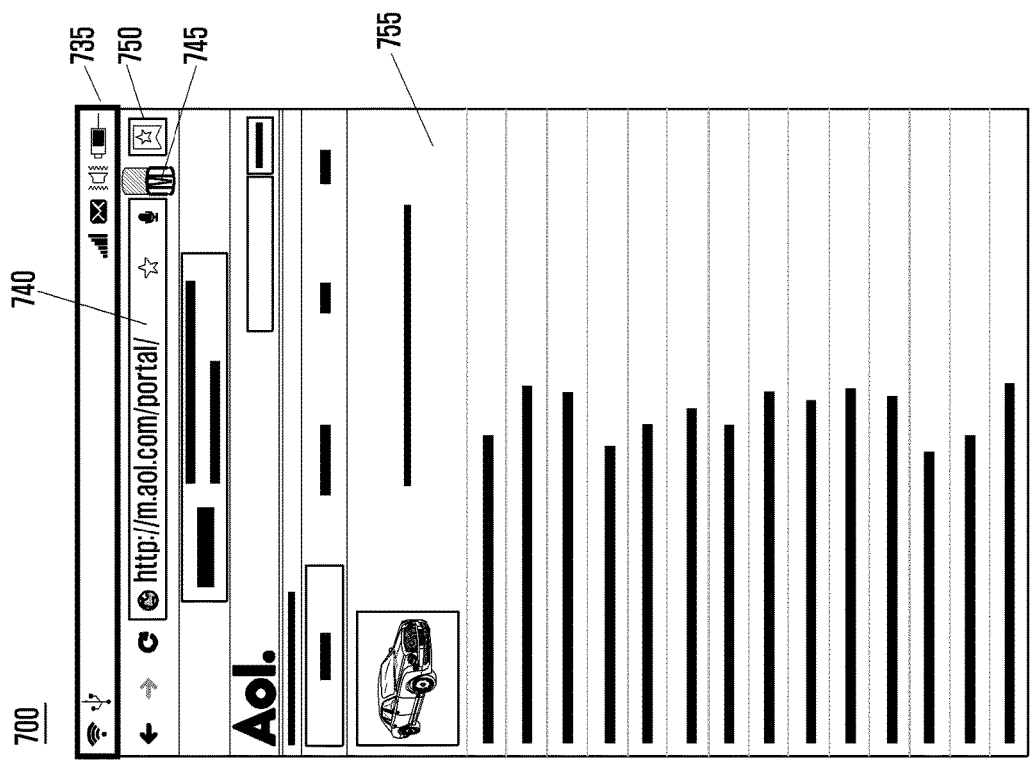
FIG. 7A and FIG. 7B are example views illustrating another example conversion of a display mode in accordance with aspects of the present disclosure.
Figure 7B:
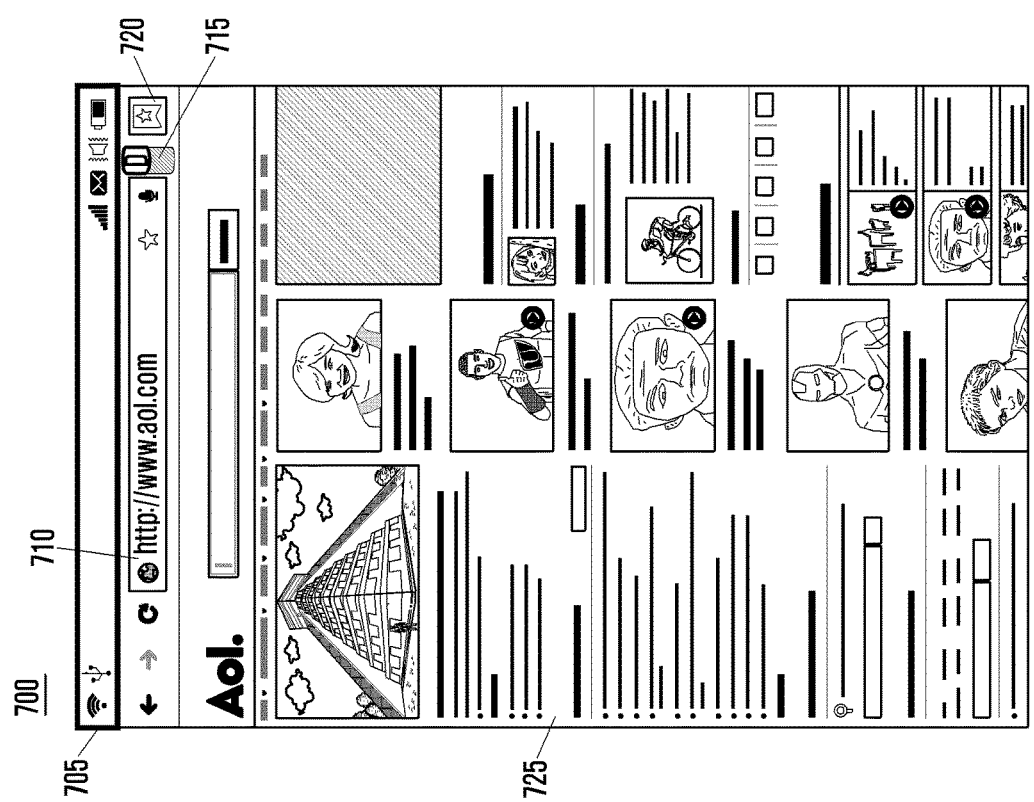

FIGS. 7A and 7B are example views illustrating a conversion of a display mode in accordance with aspects of the present disclosure. More specifically, FIG. 7A is a view illustrating a page for a desktop, and FIG. 7B is a view illustrating a page for a mobile device. Referring to FIG. 7A, a display unit 700 may include a state display area 705, an address area 710, a display mode change area 715, a bookmark configuration area 720 and a page area 725.

In one example, the state display area 705 may indicate the state of the electronic device. The address area 710 may display the address of the page being displayed or to be displayed via display unit 700. The display mode change area 715 may be a UI that allows a user to change a display mode of a page displayed or about to be displayed on display unit 700, and the display mode change area 715 may be rendered with a switch button. When a touch or a drag input is detected on the switch button, the mode may be switched and the mode may be indicated on the switch button. The bookmark configuration region 720 may allow a user to configure a visited page record or a bookmark in the browser. The page area 725 may display a page corresponding to the address input in the address area 710. In this example, the page area 725 may display the site "aol.com" in a desktop display mode.

Referring to FIG. 7B, a display unit 700 may include a state display area 735, an address area 740, a display mode change area 745, a bookmark configuration area 750 and a page area 755. In another example, the state display area 735 may provide state information of the electronic device and the address display region 740 may display the address of the page being displayed or to be displayed via display unit 700. The display mode change area 745 may be a UI that allows a user to change a display mode of a page displayed or about to be displayed on display unit 700, and the display mode change area 745 may rendered with a switch button. When a touch or a drag input is detected on the switch button, the display mode may be switched and information regarding the switched mode may be indicated on the switch button.

The bookmark configuration region 750 may allow a user to configure a visited page record or a bookmark in the browser. The page area 755 may display a page corresponding to the address input in the address area 740. In this example, the address area 610 may display the site "aol.com" in a mobile display mode.

In FIGS. 7A and 7B, the user may switch the mode of a page intended to be displayed by performing an input on the display mode change areas 715 and 745. In another example, the input may be a touch input or a drag input which moves in a specific direction while touching, and a browser may request the page for the mobile device or the page for the desktop in accordance with the input. As shown in the example of FIG. 7A, when the touch or the drag input is applied on the display mode change area 715, the electronic device may request the server to transmit the page in a mobile display mode so that the page may be displayed as shown in FIG. 7B. In one example, the address sent in the request may be obtained from a visited page record or a bookmark stored in the device. In a further example, the address in the request may be the address input by the user in address area 710 and the request may be transmitted when an input is applied to display mode change area 715.

Figure 8A:
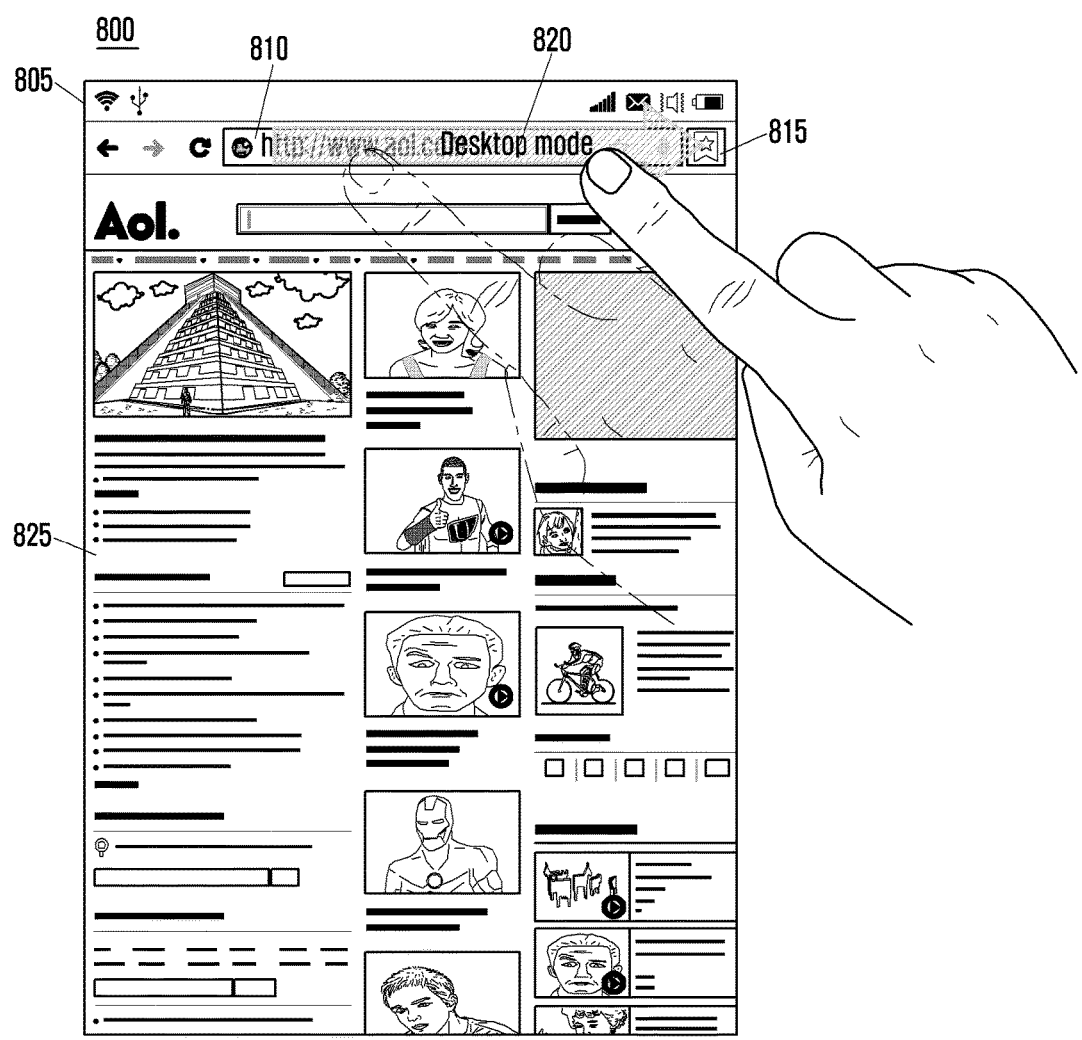
FIG. 8A and FIG. 8B are example views illustrating a further example conversion of a display mode in accordance with aspects of the present disclosure.
Figure 8B:
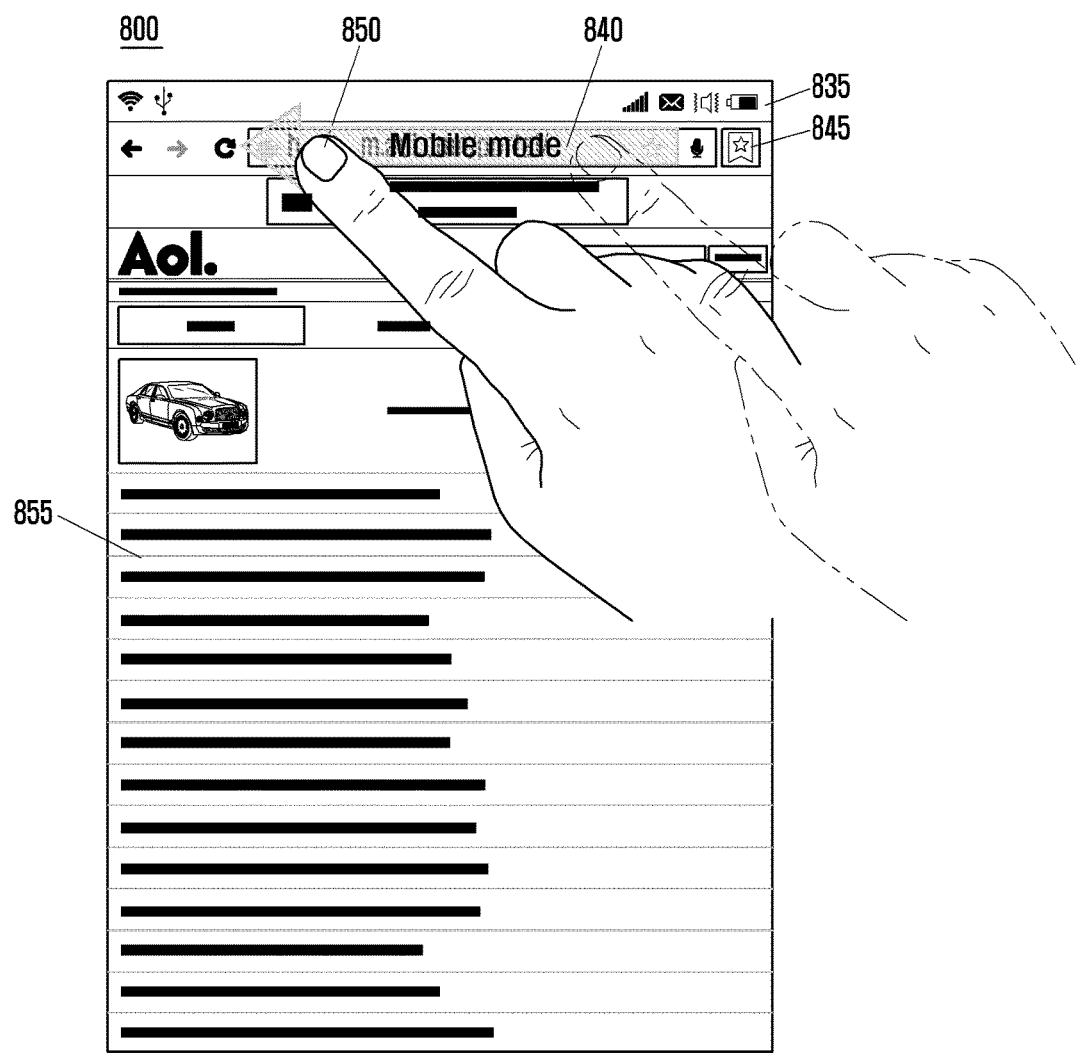

FIGS. 8A and 8B are example views illustrating a conversion of a display mode in accordance with aspects of the present disclosure. More specifically, FIG. 8A is a view illustrating a page for a desktop, and FIG. 8B is a view illustrating a page for a mobile device. Referring to FIG. 8A, a display unit 800 of the electronic device may include a state display area 805, an address area 810, a bookmark configuration region 815 and a page area 825.

The state display area 805 may provide state information of the electronic device and the address area 810 may display the address of the page being displayed or to be displayed via display unit 800. The page area 825 may display a page corresponding to the address input in address area 810. The page area 825 may display a page corresponding to the address input on the address area 810. In this example, the page area may display the page for "aol.com" in a desktop mode. The bookmark configuration region 815 may receive an input for managing the bookmarks of the browser.

Referring to FIG. 8B, the display unit 800 of a device may include a state display area 835, an address area 840, a bookmark configuration area 845 and a page area 855.

The state display area 835 may provide state information of the electronic device and the address area 840 may display the address of the page being displayed or to be displayed via display unit 800. The page area 855 may display a page corresponding to the address input in address area 840. The page area 855 may display a page corresponding to the address input in address area 840. In this example, the page area may display the page for "aol.com" in a mobile mode. The bookmark configuration region 815 may receive an input for managing the bookmarks of the browser.

As shown in FIGS. 8A, and 8B, the user may switch the display mode by inputting slide inputs 820 and 840 to the address areas 810 and 840. In another example, the address areas 810 and 840 may partially overlap the display mode change area.

Inn this example, when an address is input to the address area 810 and the slide input 820 is input in the right direction, the electronic device may send a request for a page in a desktop display mode to the server corresponding to the address, and when the slide input 850 is applied in the left direction, the electronic device may transmit a request for a page in the mobile display mode to the server corresponding to the address. The direction of the slide input may be determined such that an address is input first and the mode selective input is received, or the display mode may be switched in accordance with the slide input with respect to the already displayed page. A UI that the input has been received in accordance with the drag mode may be displayed as shown in the drawings, and the UI may be configured to be a transparent UI so that the UI may overlap the address area 810 as shown in FIGS. 8A-B.

Figure 9:
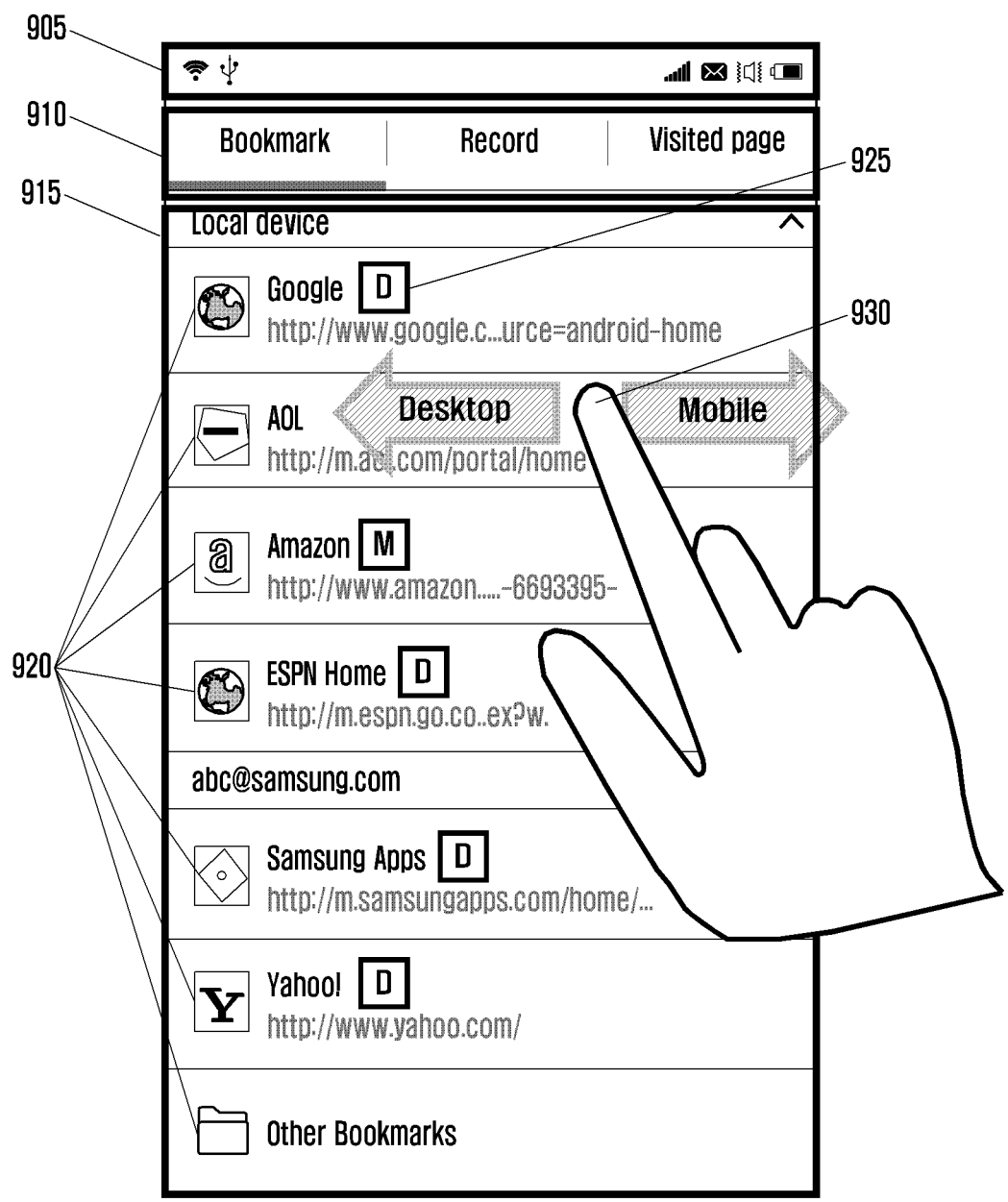
FIG. 9 is an example view illustrating an example display mode management in accordance with aspects of the present disclosure.

FIG. 9 is an example view illustrating an example display mode management in accordance with aspects of the present disclosure. More particularly, FIG. 9 illustrates an example method of managing a page display list in a visited page list or a bookmark list page. Referring to FIG. 9, a display unit of the electronic device may include a state display area 905, a menu selection area 910, and a page list display area 915. In one example, the state display area 905 may indicate the state of the electronic device. The menu selection area 910 may display a UI that allows a user to select a bookmark, a recorded page, and a visited page list.

The page list display area 915 may display page information 920. The page information 920 may be associated with at least one page. The page information 920 may be displayed in a page list corresponding to a menu of the menu selection area 910, and may display a name of the site, a display mode 925 and a page URL. The configured display mode 925 may be displayed as "M" in the case of a page for a mobile device, and as "D" in the case of a page for a desktop. When the mode selection input 930 is detected in the list, a display mode of a page on which the input was detected may be modified.

While the examples herein alternate between two display modes (e.g., mobile display mode and desktop display mode) it is understood that more than two display modes may be rendered in accordance with devices having display sizes other than mobile display size or desktop display size. It is understood that the two display sizes discussed in the present disclosure are for ease of illustration. For example, in addition to the mobile and desktop modes, the page may be displayed as a basic page. Also, a basic mode of the page shown in FIG. 9 may be changed in accordance with the input of the user at the time of displaying each page.

Figure 10:
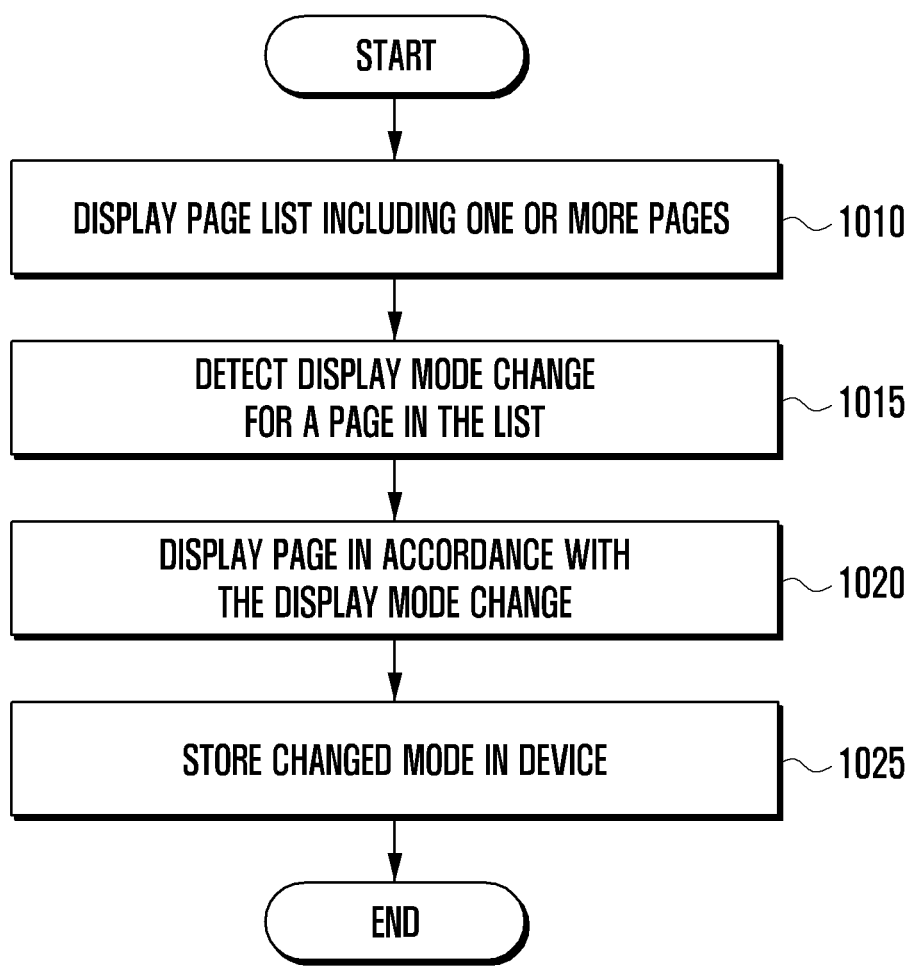
FIG. 10 is a flow chart illustrating an example page management method in accordance with aspects of the present disclosure.

FIG. 10 is a flow chart illustrating an example page management method in accordance with aspects of the present disclosure. Referring to FIG. 10, the electronic device may display a page list containing information associated with at least one page on the display unit at block 1010. Information displayed in the page list may include one or more items associated with a page, such as display mode, a display mode change area that allows a user to change the display mode, an address of the page, and an icon of the page.

In one example, the mode change area may be displayed as a switch together with the mode information. In another example, the mode information may be displayed in accordance with input from a hold button and the mode information may be changed in accordance with the hold button input.

At block 1015, the electronic device may detect a display mode change entered for a specific page in the page list. In one example, the user input is disposed at a position corresponding to the mode switch area and the electronic device may change a configuration of displaying the specific page based on the user input. In one example, the drag (slide) input is disposed on an area which displays information related to the specific page in the page list, and the display mode of the page may be changed based on the slide direction. The electronic device may detect a slide input at a position of the list corresponding to the specific page. Also, the electronic device may transmit a request to display the page in the changed mode to another communication identity or a storage unit of the electronic device.

At block 1020, the electronic device may display the specific page in accordance with the display mode change at block 1015. In one example, the electronic device may display the specific page in accordance with the display mode change specified by a direction of the slide input. The electronic device may display a page based on a response of the request transmitted at block 1015 to the server in which the page is stored.

At block 1025, the electronic device may store the changed display mode of the specific page. Accordingly, when a user makes a future request for the specific page, the electronic device may display the specific page in the changed display mode. In another example, block 1020 and block 1025 may be performed in any the order.

The examples shown and described herein were used to properly explain the technical contents of the disclosed techniques and to make the present disclosure understandable by one of ordinary skill in the art. Thus, the examples herein are not intended to limit the scope of the present disclosure. It is understood that alternate implementations may be carried out on the basis of the spirit and scope of the present disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

In addition, an artisan understands and appreciates that a "processor" or "microprocessor" constitute hardware in the claimed invention. Under the broadest reasonable interpretation, the appended claims constitute statutory subject matter in compliance with 35 U.S.C. § 101.

The functions and process steps herein may be performed automatically or wholly or partially in response to user command. An activity (including a step) performed automatically is performed in response to executable instruction or device operation without user direct initiation of the activity.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. § 101 and does not constitute software per se.

What is claimed is:

1. A method for displaying a page of an electronic device including a touch screen and at least one processor, the method comprising:
controlling, by the at least one processor, the touch screen to display an address corresponding to a page on an address area of the touch screen;
receiving, by the at least one processor, a user gesture sliding in a specific direction on the address area of the touch screen while the address corresponding to the page is displayed on the address area;
identifying, by the at least one processor, a display mode for the page based on the specific direction; and
controlling, by the at least one processor, the touch screen to display the page with the identified display mode on a content area of the touch screen.

2. The method of claim 1, further comprising:
transmitting, by the at least one processor, to a server for the page using a transceiver of the electronic device, information for the display mode including information for a user agent (UA),
wherein the information for the UA is identified based on a type of the electronic device and the display mode.

3. The method of claim 1, further comprising:
controlling, by the at least one processor, the touch screen to display a virtual hold button on the touch screen,
wherein the display mode is identified based on a touch input or a press input on the virtual hold button.

4. The method of claim 1, further comprising:
controlling, by the at least one processor, the touch screen to display a virtual switch button on the touch screen,
wherein the display mode is identified based on a touch input or a drag input on the virtual switch button.

5. The method of claim 1, wherein
the display mode is identified based on a visited page record or bookmark information stored in a memory of the electronic device.

6. The method of claim 1, further comprising:
storing, by the at least one processor, the display mode for the page with the address corresponding to the page in a memory of the electronic device.

7. An electronic device comprising:
a touch screen;
a memory;
a transceiver; and
at least one processor operatively coupled with the touch screen, the memory and the transceiver and configured to:
control the touch screen to display an address corresponding to a page on an address area of the touch screen,
receive a user gesture sliding in a specific direction on the address area of the touch screen while the address corresponding to the page is displayed on the address area,
identify a display mode for the page based on the specific direction, and
control the touch screen to display the page with the identified display mode on a content area of the touch screen.

8. The electronic device of claim 7, wherein the at least one processor is further configured to transmit, to a server for the page using the transceiver, information for the display mode including information for a user agent (UA),
wherein the information for the UA is identified based on a type of the electronic device and the display mode.

9. The electronic device of claim 7, wherein the at least one processor is further configured to control the touch screen to display a virtual hold button on the touch screen, and
wherein the display mode is identified based on a touch input or a press input on the virtual hold button.

10. The electronic device of claim 7, wherein the at least one processor is further configured to control the touch screen to display a virtual switch button on the touch screen, and
wherein the display mode is identified based on a touch input or a drag input on the virtual switch button.

11. The electronic device of claim 7, wherein the at least one processor is further configured to store the display mode for the page with the address corresponding to the page in the memory.

12. The electronic device of claim 7, wherein the display mode is identified based on a visited page record or bookmark information stored in a memory of the electronic device.

\* \* \* \* \*